United States Patent [19]
Fritz

[11] Patent Number: 6,162,005
[45] Date of Patent: Dec. 19, 2000

[54] VEHICLE RESTRAINT WITH POWERED LATCHING MEMBER

[75] Inventor: Ben Fritz, Milwaukee, Wis.

[73] Assignee: Kelley Company, Inc., Mequon, Wis.

[21] Appl. No.: 09/386,807

[22] Filed: Aug. 31, 1999

[51] Int. Cl.[7] .............................................. B65G 69/00
[52] U.S. Cl. .......................................................... 414/401
[58] Field of Search ............................................ 414/401

[56] References Cited

U.S. PATENT DOCUMENTS

| | | | |
|---|---|---|---|
| 3,665,231 | 5/1972 | Wendler | 310/77 |
| 4,264,259 | 4/1981 | Hipp | 414/401 |
| 4,488,325 | 12/1984 | Bennett et al. | 14/71.3 |
| 4,648,781 | 3/1987 | Sikora | 414/401 |
| 4,674,941 | 6/1987 | Hageman | 414/401 |
| 4,684,838 | 8/1987 | Casanova | 310/93 |
| 4,695,216 | 9/1987 | Erlandsson | 414/401 |
| 4,728,242 | 3/1988 | Erlandsson | 414/401 |
| 4,759,678 | 7/1988 | Hageman | 414/401 |
| 4,767,254 | 8/1988 | Kovach et al. | 414/401 |
| 4,784,567 | 11/1988 | Hageman et al. | 414/401 |
| 4,815,918 | 3/1989 | Bennett et al. | 414/401 |
| 4,861,217 | 8/1989 | Erlandsson | 414/401 |
| 4,865,508 | 9/1989 | Carlson | 414/401 |
| 4,938,647 | 7/1990 | Erlandsson | 414/401 |

OTHER PUBLICATIONS

DOK–LOK® LDL–500 Series, Low Profile, A Rite–Hite Corp. Vehicle Restriant, Owner's Manual, Rite–Hite® Corporation, Pub. No. 064–G3 (May 1989).

*Primary Examiner*—Steven A. Bratlie
*Attorney, Agent, or Firm*—Michael Best & Friedrich LLP

[57] ABSTRACT

A loading dock and vehicle restraint assembly for securing a vehicle during loading operations. The vehicle restraint comprises a latching member (e.g., a hook) movable between an engaged position and a disengaged position, and an electromechanical brake coupled to the latching member and movable between a restraining position, where the latching member is restrained from movement, and an unrestraining position, where the latching member can be moved. Preferably, the brake is mechanically biased toward the restraining position (e.g., by a spring), and is moved to the unrestrained position by an electromagnet. The assembly can be used to perform a method of restraining a vehicle at a desired location using a vehicle restraint having a latching member and a brake coupled to the latching member. The method includes the steps of parking the vehicle at a desired location, positioning the brake in an unrestraining position to allow movement of the latching member; moving the latching member from a disengaged position to an engaged position, and positioning the brake in a restraining position to restrain movement of the latching member. The new design is also adapted to be easily installed onto existing vehicle restraints.

16 Claims, 4 Drawing Sheets

VEHICLE RESTRAINT WITH POWERED LATCHING MEMBER

BACKGROUND OF THE INVENTION

1. Technical Field of the Invention

The present invention relates to devices and methods for restraining vehicles, and more particularly, to vehicle restraints for releasably securing vehicles to structures.

2. Description of the Related Art

Vehicle restraints are used to secure vehicles (e.g., trucks and/or trailers) to structures such as warehouses and loading docks. These devices secure vehicles to structures so that they cannot be moved except when these devices are intentionally released. One such device employs a hook to engage a portion of the vehicle. A motor drives the hook from a disengaged position to an engaged position to secure the vehicle to the structure. This engagement allows heavy equipment and personnel to enter and exit the vehicle without the vehicle separating from the loading dock.

Some vehicle restraints actuate the motor that moves the hook for a pre-determined period of time. The period of time, for example, may correspond to the amount of time it takes for the hook to reach its highest elevated position. Depending on the height of the engaging portion of a vehicle, the motor may attempt to drive the hook even after the hook is engaged. Vehicle restraints of this type may compensate for this condition by utilizing a slip clutch which permits the driveshaft of the motor to "free wheel" or continue to rotate even after the hook is engaged.

A known problem with this type of vehicle restraint is that varying loads, such as when heavy equipment is driven onto and off of a vehicle or when freight is loaded or unloaded from a vehicle, create excessive up-and-down motions or vibrations that can cause the clutch to slip and the hook to become disengaged. If left uncorrected, the vehicle could separate from the structure jeopardizing the safety of personnel and the condition of the equipment.

A known approach to overcome this problem monitors the engagement between the hook and the vehicle. When the hook becomes disengaged from the vehicle, the vehicle restraint may activate an alarm or automatically actuate the motor to drive the hook back to the engaged position. Unfortunately, should this condition occur regularly, the vehicle restraint motor and clutch may prematurely wear, and thus require frequent replacement or repair.

SUMMARY OF THE INVENTION

The present invention mitigates the above-described conditions by providing a vehicle restraint that employs a brake and a latching member, which by way of example can be a brake and a hook. The brake is mechanically biased to resist motion when the latching member is in a restrained state. The securing effectiveness of the invention does not depend on a clutch that couples a pair of rotatable shafts. Rather the invention utilizes a brake designed to resist motion.

More specifically, the present invention provides a loading dock and vehicle restraint assembly for securing a vehicle during loading operations. The vehicle restraint comprises a latching member (e.g., a hook) movable between an engaged position and a disengaged position, and an electro-mechanical brake coupled to the latching member and movable between a restraining position, where the latching member is restrained from movement, and an unrestraining position, where the latching member can be moved. Preferably, the brake is mechanically biased toward the restraining position (e.g., by a spring), and is moved to the unrestrained position by an electromagnet.

The above-described assembly can be used to perform a method of restraining a vehicle at a desired location using a vehicle restraint having a latching member and a brake coupled to the latching member. The method includes the steps of parking the vehicle at a desired location, positioning the brake in an unrestraining position to allow movement of the latching member; moving the latching member from a disengaged position to an engaged position, and positioning the brake in a restraining position to restrain movement of the latching member. Preferably, the step of positioning the brake in an unrestraining position includes the step of energizing an electromagnet, and the step of positioning the brake in a restraining position includes the step of deenergizing the electromagnet. In addition, the step of positioning the brake in a restraining position can include the step of utilizing stored energy in a spring to provide movement to the brake.

The new design is also adapted to be easily installed onto existing vehicle restraints. For example, the design can be used in a method of modifying a vehicle restraint having a carriage, a latching member movably coupled to said carriage, and a drive mechanism coupled to the latching member. The method comprises the steps of uncoupling the drive mechanism from the latching member, coupling a new drive mechanism to the latching member, and coupling an electromechanical brake to the latching member. In a preferred embodiment, the new drive mechanism and the brake are physically a single unit, so that the steps of coupling a new drive mechanism and coupling an electromechanical brake are performed simultaneously.

The disclosed devices and methods reduce or eliminate mechanical slip creating an improved vehicle restraint device. The devices and methods of this invention minimize motor wear and eliminate the need for a clutch. The technology that provides these devices and these methods is compatible with existing vehicle restraint hardware, rendering a low-cost highly flexible technology that can be integrated with or attached to many existing vehicle restraint devices. These features as well as other advantages of the invention will become apparent upon consideration of the following detailed description and accompanying drawings of the embodiments of the invention described below.

DETAILED DESCRIPTION

Figure 1:
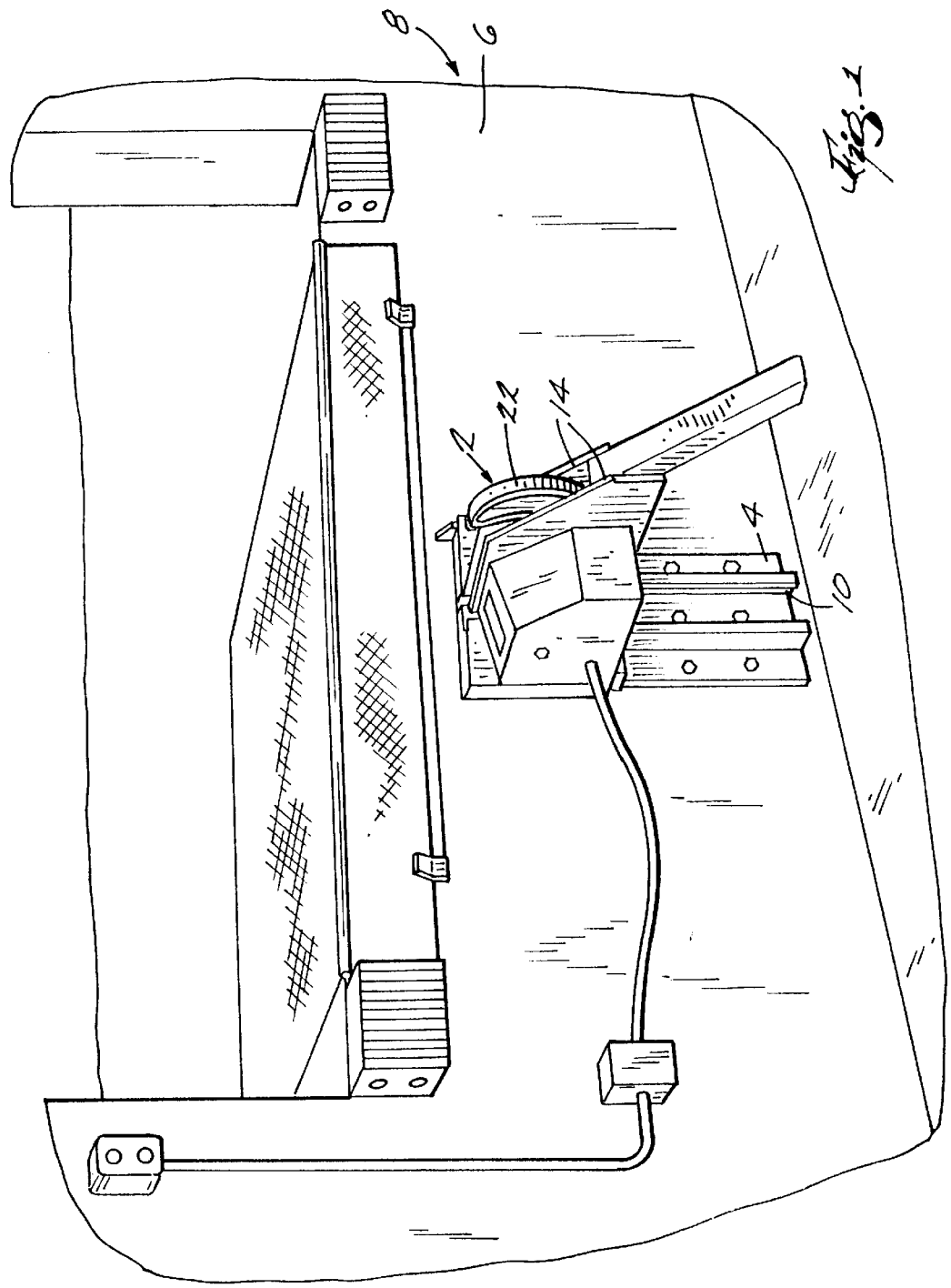
FIG. 1 is perspective view of a preferred embodiment of the invention.
Figure 2:
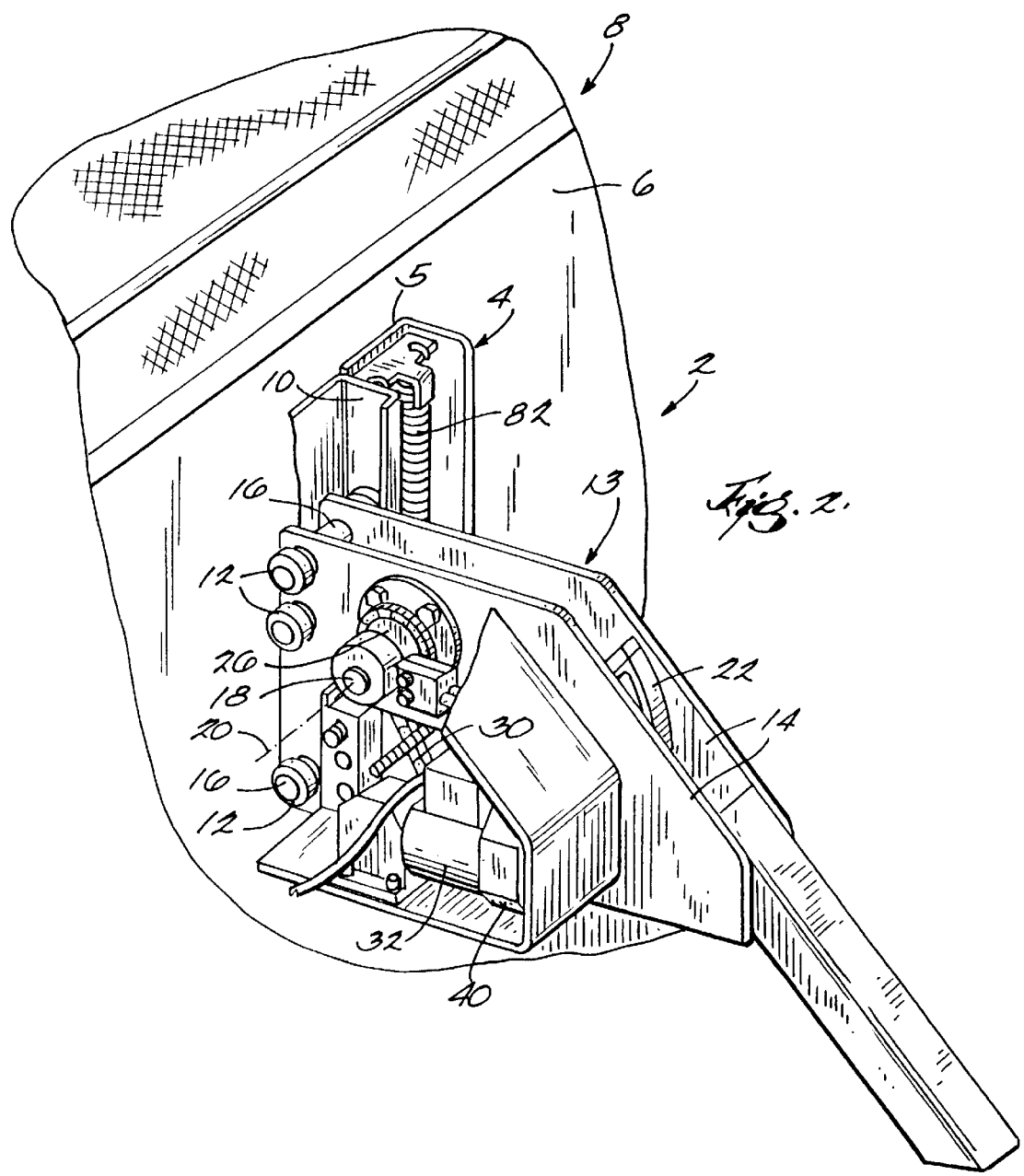
FIG. 2 is an enlarged perspective view of the preferred embodiment of FIG. 1 with a portion broken away.

In the drawings, depicted elements are not necessarily drawn to scale, and alike and similar elements are designated by the same reference numeral through several views.

The illustrated vehicle restraint has base 4 in the form of a partially rectangular frame interconnected with side members 5 (one of which is shown) designed to be mounted to a vertical surface 6 of a structure 8, such as a loading dock. The base 4 has a track 10 adapted to receive a plurality of rollers 12 that are fitted by axles 16 to a carriage 13 having a pair of generally parallel plate members 14. The plate members 14 support a shaft 18 that rotates about a fixed axis 20 to transmit motion to a latching member 22. Springs 82 (one of which is shown) are connected between the carriage 13 and the base 4 to bias the carriage 13 upward relative to the base 4.

Figure 3:
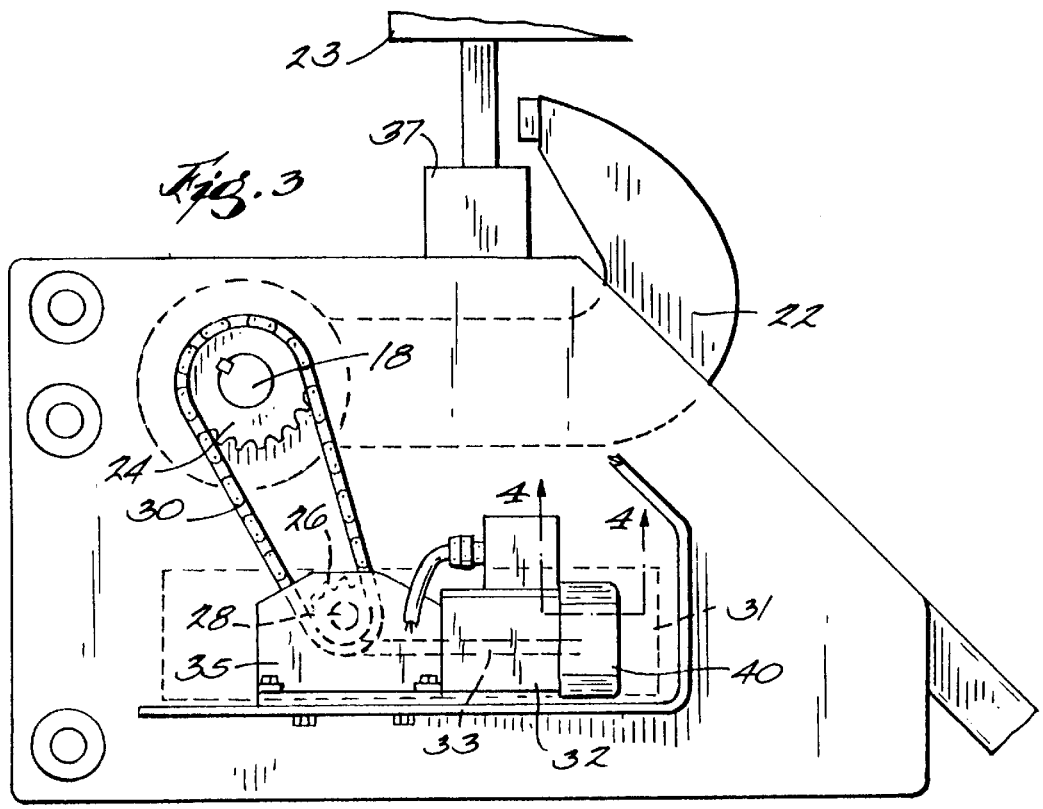
FIG. 3 is a side view of the preferred embodiment of FIG. 1 with a side cover removed illustrating the motor, the linking member, the brake, and the latching member.

The illustrated restraint also includes a latching member in the form of a hook 22, but can be any mechanical device or assembly that can secure a vehicle 23. As best shown in FIG. 3, the hook 22 is secured to the shaft 18, which allows the hook 22 to rotate at substantially the same speed and in the same direction as the shaft 18. A gear wheel 24 secured near one end of the shaft 18 receives rotary motion and torque from a sprocket 26 or pinion gear affixed to a driveshaft 28. As shown, the gear wheel 24 and sprocket 26 are connected by a chain 30 or other linking member. The gear wheel 24 and sprocket 26, however, can also have many other spatial relationships with respect to one another, such as directly engaging or spaced far apart.

A drive mechanism, which is illustrated as a motor 32, a motor shaft 33, and a gear box 35 are positioned to effect pivotal movement of the hook 22 by transferring rotary motion from the motor 32 to the motor-shaft 33, to gears within the gear box 35 to the driveshaft 28. The rotary motion transmitted to the driveshaft 28 is transmitted to the hook 22 by means of the sprocket 26, the chain 30, the gear wheel 24, and the shaft 18. The rotary motion of the driveshaft 28 is smoothly transferred to the hook 22 until the hook 22 engages an obstruction (e.g., an ICC bar 37 on a vehicle shown in FIG. 3).

Figure 5:
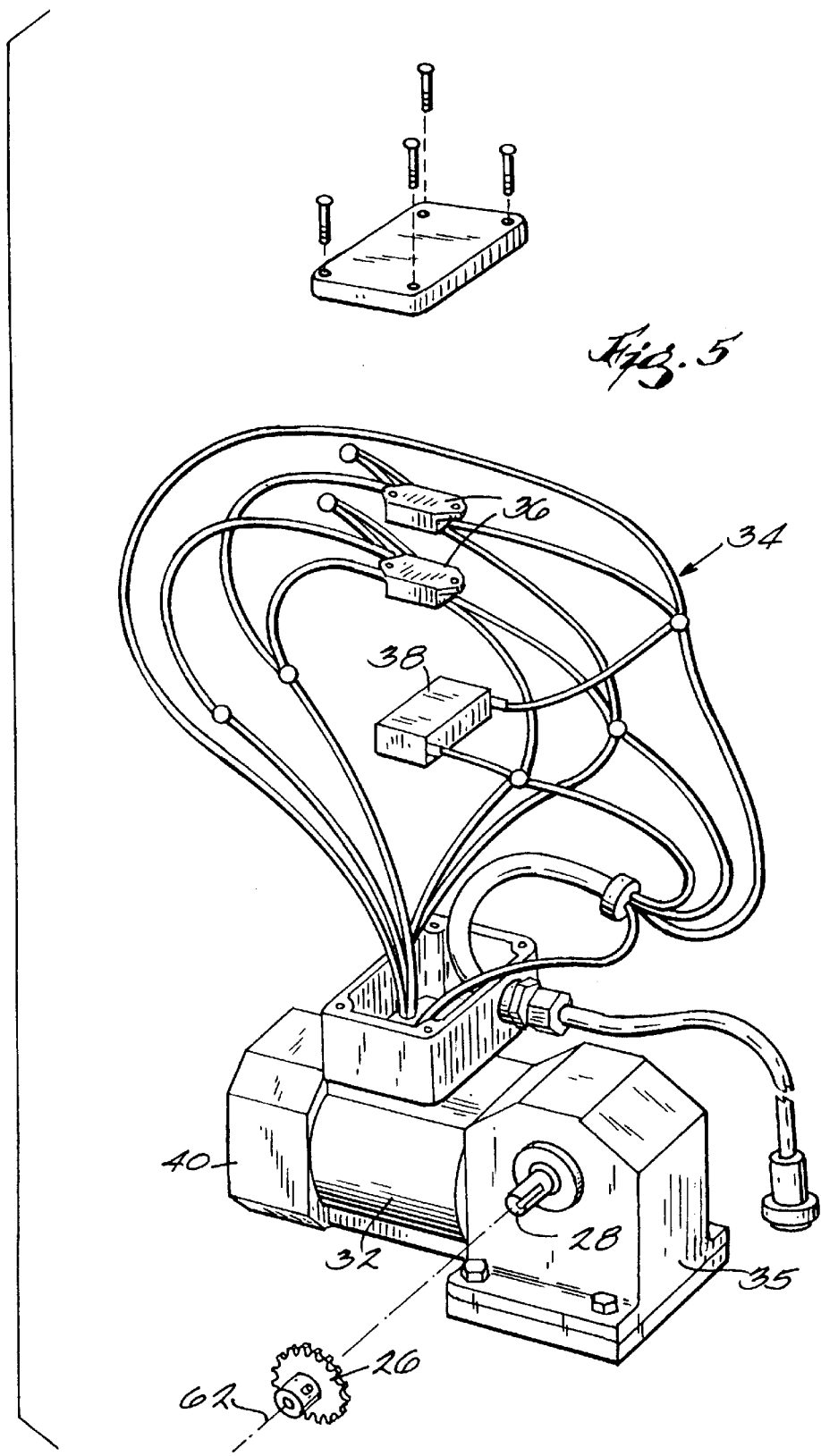
FIG. 5 is a perspective view of the motor with an exploded view of the power source of FIG. 1.

A power supply 34 shown in exploded view in FIG. 5, provides direct current to the motor 32. A pair of rectifiers 36 converts alternating current into direct current, which is filtered by a capacitor 38. In this exemplary embodiment, full-wave rectification is employed. In other forms of the invention, half-wave rectification or other circuit designs can be used.

Figure 4:
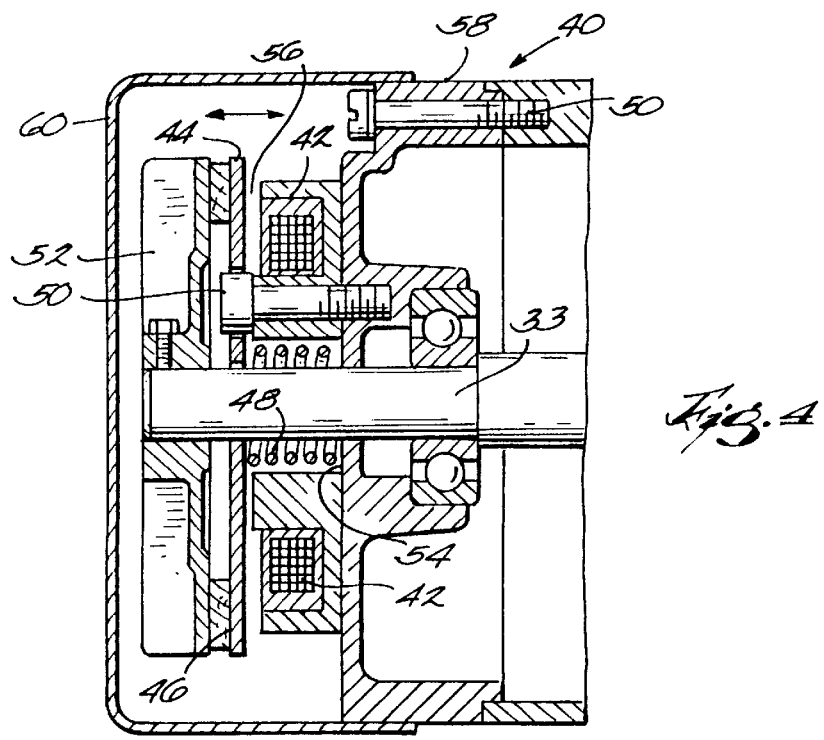
FIG. 4 is a section view taken along line 4—4 of FIG. 3.

A brake 40 is mounted to the motor 32 shown in FIG. 5 and is movable between a restraining position and an unrestraining position. In the restraining position, the brake 40 prevents the driveshaft 28 from moving and, in the unrestraining position, the brake 40 allows the driveshaft 28 to move. In the embodiments employing electromechanical brakes, such as the exemplary embodiment illustrated in FIG. 4, the brake 40 includes a stator 42, an armature 44, an engaging surface 46, a biasing member in the form of a spring 48, and fasteners 50. As designed, the brake 40 resists the rotary motion of the motor shaft 33 by the frictional engagement of the armature 44 and the engaging surface 46 of a disk 52. The spring 48 urges the armature 44 against the engaging surface 46 to provide a self-adjusting engagement that compensates for disk wear. An air gap 56 separates the armature 44 from the stator 42. Fasteners 50 connect the brake 40 to the motor 32. The fasteners 50, which are illustrated as a threaded bolt near the perimeter of the brake 40, are rigidly retained by a threaded hole (not shown) formed within a housing 58 of the motor 32. A brake cover 60, shown in rectangular profile, is slidably attached to the housing 58 to shield the stator 42, the armature 44, the engaging surface 46, the spring 48, and the fasteners 50 from contaminants and moisture. Vents (not shown) in the brake cover 60 can also be provided to increase air circulation and cooling.

From the foregoing detailed description and accompanying figures it should be apparent that the brake 40 naturally resists the motion of the hook 22 through contact between the armature 44 and the engaging member 46. Normal rotation of the hook 22 is allowed only when the brake 40 is released. In this regard, the brake 40 can be any mechanical, hydraulic, pneumatic or other assembly that inhibits movement by mechanical or fluid friction between a moving and a stationary member. Moreover, the brake 40 can be coupled to any element or combination of elements that affect motion of the hook 22. For example, the brake 40 may be coupled with the sprocket 26, the linking member 30, the gear wheel 24, the shaft 18, or any other element or combination of elements that transmits or generates motion to the latching member 22. If desired, the brake 40 may be directly coupled to the hook 22.

When not in use, the vehicle restraint 2 is in a disengaged position. In the disengaged position, shown in FIG. 2, the hook 22 is recessed within the carriage 13. From the disengaged position, the vehicle restraint 2 may be engaged when a vehicle is adjacent to the loading dock or structure. Referring to FIGS. 1–5, by operation of a switch, a controller, or any other actuating device (not shown), the power source 34 energizes the stator 42, which causes the armature 44 to separate from the engaging surface 46 of the disk 52. This is referred to as the unrestraining position of the brake 40. When activated, the motor 32 pivotally raises the hook 22 by rotating the motor shaft 33 which is linked to the driveshaft 28 by the gearbox 35. The driveshaft 28 rotates about a fixed axis 62 concentric with the sprocket 26. The sprocket 26 transfers the rotary motion and torque of the driveshaft 28 to the nylon or metal roller chain 30 wrapped around the aligned sprocket 26 and gear wheel 24. As the chain 30 passes over the sprocket teeth, the chain 30 transmits the turning force of the motor 32 to the gear wheel 24. Rotation of the gear wheel 24 causes the shaft 18 to rotate about a fixed axis pivotally raising the hook 22 from the disengaged position to the engaged position. The continued rotation of the shaft 18 raises the hook 22 until it bears against a portion of the vehicle, such as the ICC bar 37. When the motor shaft 33 is subject to a predetermined torque caused by the engagement of the hook 22 with the ICC bar 37, the motor 32 is deactivated. Alternatively, the motor 32 can be activated for a set period of time and then deactivated.

At this point, the power source 34 de-energizes the stator 42, thereby placing the brake in a restraining position. The absence of a magnetic field with respect to the armature 44 causes the armature 44 to engage the engaging surface 46 of the disk 52, due to the bias of the spring 48, to maintain the hook 22 in the engaged position. In this position, heavy equipment such as a forklift can be driven onto and off of the vehicle or freight can be loaded or unloaded from the vehicle without fear that the vehicle may become separated from the loading dock.

After freight is loaded or unloaded from the vehicle 23, the hook 22 is disengaged from the ICC bar 37 by supplying electrical power to both the brake 40 and the motor 32. When power energizes the brake 40, the armature 44 separates from the engaging surface 46 of the disk 52. This separation substantially reduces the braking force that holds the hook 22 in its engaged position. The motor 32 then rotates the motor shaft 33, the gears within the gearbox 35, and the driveshaft 28 in a reverse direction. The rotation of the driveshaft 28 causes the sprocket 26, the chain 30, the gear wheel 24, and the shaft 18 to rotate in the reverse direction. When the motor shaft 33 is subject to a predetermined torque caused by the engagement between the carriage 13 and the hook 22, the motor 32 is deactivated and the stator 42 is de-energized returning the hook 22 to the restrained state.

The brake 40, if desired, can be used to modify existing vehicle restraint devices. When the brake 40 is added to an existing device, the brake 40 can be interconnected to an end of the motor shaft 33 or the driveshaft 28. Alternatively, the entire motor can be replaced with a new motor having a brake.

Vehicle restraints of the type described above have been successfully fabricated utilizing the following principal elements.

| | |
|---|---|
| Vehicle restraint modified | DOK LOK ™ |
| Manufactured by | Rite-Hite Corporation |
| Motor | DC single speed gearmotor |
| Manufactured by | Brother |

As used herein the following terms are used as indicated. The term "coupled" is intended to broadly encompass both direct and indirect coupling. Thus, when parts are coupled together they may be directly connected or connected via one or more intermediate parts. The term "position" is intended to broadly encompass a range of positions.

The foregoing detailed description describes only a few of the many forms that the present invention can take, and should therefore be taken as illustrative rather than limiting. It is only the following claims, including all equivalents that are intended to define the scope of the invention.

What is claimed is:

1. A loading dock and vehicle restraint assembly for securing a vehicle during loading operations, said assembly comprising:
   a loading dock; and
   a vehicle restraint coupled to said loading dock, said vehicle restraint comprising:
      a latching member movable between an engaged position and a disengaged position; and
      an electromechanical brake coupled to said latching member and movable between a restraining position, where said latching member is restrained from movement, and an unrestraining position, where said latching member can be moved.

2. The assembly of claim 1, further comprising a carriage movably coupled to said loading dock, said latching member being coupled to said carriage.

3. The assembly of claim 2, further comprising a biasing member coupled to said carriage to bias said carriage upward.

4. The assembly of claim 1, further comprising a drive mechanism coupled to said latching member to move said latching member between the engaged and disengaged positions.

5. The assembly of claim 4, further comprising a shaft coupled between said latching member and said drive mechanism such that the rotation of said shaft causes said latching member to rotate at substantially the same speed and in the same direction as said shaft and substantially free from slip.

6. The assembly of claim 4, wherein said drive mechanism comprises an electric motor.

7. The assembly of claim 1, wherein said latching member comprises a hook.

8. The assembly of claim 1, wherein said brake is mechanically biased toward the restraining position.

9. The assembly of claim 8, wherein actuation of said brake moves said brake from the restraining position to the unrestraining position.

10. The assembly of claim 9, wherein said brake includes an electromagnet for moving said brake from the restraining position to the unrestraining position.

11. A method of restraining a vehicle at a desired location using a vehicle restraint having a latching member and a electro-mechanical brake coupled to the latching member, said method comprising the steps of:
   parking the vehicle at a desired location;
   positioning the brake in an unrestraining position to allow movement of the latching member;
   moving the latching member from a disengaged position to an engaged position; and
   positioning the brake in a restraining position to restrain movement of the latching member.

12. The method of claim 11, wherein said step of positioning the brake in an unrestraining position includes the step of energizing an electromagnet.

13. The method of claim 12, wherein said step of positioning the brake in a restraining position includes the step of deenergizing the electromagnet.

14. The method of claim 11, wherein said step of positioning the brake in a restraining position includes the step of utilizing stored energy in a spring to provide movement to the brake.

15. A method of modifying a vehicle restraint having a carriage, a latching member movably coupled to said carriage, and a drive mechanism coupled to the latching member, said method comprising the steps of:
   uncoupling the drive mechanism from the latching member;
   coupling a new drive mechanism to the latching member; and
   coupling an electromechanical brake to the latching member.

16. The method of claim 15, wherein said steps of coupling a new drive mechanism and coupling an electromechanical brake are performed simultaneously.

* * * * *